United States Patent Office 3,672,862
Patented June 27, 1972

3,672,862
RHIZOBITOXINE AS A POST-EMERGENT HERBICIDE
Lowell D. Owens, Greenbelt, Md., assignor to the United States of America as represented by the Secretary of Agriculture
No Drawing. Continuation-in-part of application Ser. No. 757,117, Sept. 3, 1968. This application Dec. 12, 1969, Ser. No. 884,727
Int. Cl. A01n 9/00
U.S. Cl. 71—79                                   2 Claims

ABSTRACT OF THE DISCLOSURE

Rhizobitoxine, a phytotoxic compound synthesized by the bacterium Rhizobium japonicum, is combined with a specifically formulated solution of surfactant and wetting agent to provide post-emergent herbicidal activity.

---

A non-exclusive, irrevocable, royalty-free license in the invention herein described, throughout the world for all purposes of the United States Government, with a power to grant sublicenses for such purposes is hereby granted to the Government of the United States of America.

This application of a continuation-in-part of our co-pending application for patent, Ser. No. 757,117 filed Sept. 3, 1968, now abandoned.

This invention relates to rhizobitoxine and more specifically to its use as a post-emergent herbicide.

Rhizobitoxine is a phytotoxic compound synthesized by the bacterium Rhizobium japonicum and is isolated and purified from cultures of Rhizobium japonicum (Plant Physiol. 40, 931–933, 1965). Although the exact structure of the compound is unknown, a partial characterization has been published (Bact. Proc., p. 19, 1967). Johnson et al. (Nature 183, 308–9, 1959) showed that this phytotoxin exhibited a broad spectrum toxicity to many weed and crop seedlings when applied to sterile root solutions but they were unsuccessful in their attempts to demonstrate post-emergent herbicidal activity by leaf application.

Most of the post-emergent herbicides now in use possess one or more undesirable characteristics such as low biodegradability in soil or toxicity to animals. In contrast, rhizobitoxine is readily degraded and rendered nontoxic in two or three days by soil microorganisms. Furthermore, a study of its mechanism of toxicity indicates that it would not be toxic to animals. It is known to be a highly potent inhibitor of an enzyme found in microorganisms and plants but not in animals.

Scientists have long felt that the undesirable characteristics, especially low biodegradability in soil, exhibited by most post-emergent herbicides posed a serious problem and that a herbicide that could be applied to the leaf and exhibit post-emergent activity without these undesirable characteristics was sorely needed. Even Johnson cited above failed to show post-emergent herbicidal activity when he applied the phytotoxin to the leaves. In view of the history of the art and especially the negative results of Johnson, the present inventor had no reason to expect that rhizobitoxine would be effective as a post-emergent herbicide when applied to the leaves.

It is an object of this invention to provide a means by which rhizobitoxine can be utilized effectively as a post-emergent herbicide.

Another object of this invention is to provide a post-emergent herbicide that is quickly biodegradable and non-toxic to animals.

In general, according to this invention the foregoing objects are accomplished by employing a specifically for-

EFFECT OF LEAF-APPLIED RHIZOBIUM PHYTOTOXIN ON WEEDS AND CROPS

|  | Leaf-stage when treated No. of leaves | Toxin treatment [1] Micrograms of toxin | Microliters of solution | P.p.m. | Treatment effects [2] 4th day | 14th day |
|---|---|---|---|---|---|---|
| Pigweed | 4 | 10 | 20 | 500 | Some necrosis | Some necrosis, growth about normal. |
|  |  | 100 | 20 | 5,000 | Plants dying | Plants dead. |
|  |  | Control | 20 | 0 | No effect | No effect. |
| Crabgrass | 3 | 10 | 20 | 500 | Severe chlorosis | Severe chlorosis, growth somewhat stunted. |
|  |  | 100 | 20 | 5,000 | Moderate chlorosis | Severe chlorosis, growth stopped. |
|  |  | Control | 20 | 0 | No effect | No effect. |
| Corn (var. U.S. 13) | 5 | 10 | 20 | 500 | Light chlorosis | Appearance and growth about normal. |
|  |  | 100 | 20 | 5,000 | Moderate chlorosis | Some chlorosis, growth somewhat stunted. |
|  |  | Control | 20 | 0 | No effect | No effect. |
| Cotton (var. Coker 100) | 2 | 10 | 20 | 500 | None | None. |
|  |  | 100 | 20 | 5,000 | Severe chlorosis | Light chlorosis, growth somewhat stunted. |
|  |  | Control | 20 | 0 | No effect | No effect. |
| Soybean (var. Lee) | 2 | 10 | 20 | 500 | Moderate chlorosis | Appearance and growth normal. |
|  |  | 50 | 40 | 1,250 | Severe chlorosis | Moderate chlorosis and necrosis, growth severely stunted. |
|  |  | 200 | 40 | 5,000 | do | Plants dead. |
|  |  | Control | 40 | 0 | No effect | No effect. |
| Sorghum | 2 | 2 | 5 | 400 | Moderate chlorosis | Light chlorosis, growth stunted. |
|  |  | 10 | 10 | 1,000 | Severe chlorosis | Severe chlorosis, growth stopped. |
|  |  | 50 | 10 | 5,000 | do | Severe chlorosis, plants dying. |
|  |  | Control | 10 | 0 | No effect | No effect. |
| Rape (var. Dwarf Essex) | 2 | 10 | 20 | 500 | None | None. |
|  |  | 100 | 20 | 5,000 | Light chlorosis, stunted growth | Plants dead. |
|  |  | Control | 20 | 0 | No effect | No effect. |
| Ryegrass (annual) | 2 | 10 | 2 | 500 | Moderate chlorosis | Some necrosis and stunting of growth. |
|  |  | 30 | 0.6 | 5,000 | do | Do. |
|  |  | Control | 2 | 0 | No effect | No effect. |
| Wheat | 2 | 10 | 20 | 500 | Light leaf-tip chlorosis | Appearance and growth about normal. |
|  |  | 100 | 20 | 5,000 | do | Do. |
|  |  | Control | 20 | 0 | No effect | No effect. |

[1] Listed are the actual weights (micrograms) of toxin applied in the indicated volumes (microliters) of surfactant-wetting agent solution containing the specified concentrations (p.p.m.) of toxin in parts toxin per million of solution (weight per volume basis). Control treatments were the indicated volumes of surfactant-wetting agent solution without toxin.
[2] The chlorosis damage listed was observed only in the new leaf-growth which occurred soon after phytotoxin application. Leaves emerging a week or more after application were often normal in appearance. Also, leaves fully developed before toxin application remained green.

mulated solution of surfactant and wetting agent in which to dissolve rhizobitoxine to obtain post-emergent herbicidal activity. Of several mixtures tested, toxicity is obtained only with a solution consisting essentially of ethanol:water:glycerol (50:50:1 on a volume basis) in which the phytotoxin is dissolved in concentrations ranging up to 5000 parts of toxin per million of solution (weight per volume basis). As can be seen in the table, the solution in which the phytotoxin is dissolved has no phytotoxic or other effect when applied in the same quantity and manner as the phytotoxin solution.

A number of experiments showed that the phytoxin was toxic at low concentrations to many weed and crop species. Pure rhizobitoxine was dissolved in the previously noted surfactant-wetting agent solution and applied with a micropipette to the leaves of 4- to 21-day old seedlings of nine plant species. Toxic effects ranging from chlorosis to growth stunting and death were obtained with from 10 to 200 micrograms of rhizobitoxine per plant. These amounts are equivalent to about 0.01 to 0.2 pound per acre assuming a treated leaf area of 10 cm.$^2$ per plant. In comparison, the potent broad-spectrum herbicide, amino-triazole, is commonly applied at the rate of about 0.5 pound per acre.

As shown in the table, rhizobitoxine stopped the growth of or killed five of the species tested and was generally toxic to the other four species.

I claim:

1. In a process of killing pigweed by applying a phytotoxin to the leaves of the pigweed, the step of applying to the primary leaves of a 4 to 21 day old pigweed seedling 100 micrograms of rhizobitoxine, said rhizobitoxine being dissolved in 20 microliters of a solvent mixture consisting of 50 parts ethanol, 50 parts water and 1 part glycerol, said rhizobitoxine killing the pigweed within 14 days of application and said rhizobitoxine being degraded and rendered nontoxic by soil microorganisms within 3 days of application.

2. In a process for killing rape by applying a phytotoxine to the leaves of the rape, the step of applying to the primary leaves of a 4 to 21 day old rape seedling 100 micrograms of rhizobitoxine, said rhizobitoxine being dissolved in 20 microliters of a solvent mixture consisting of 50 parts ethanol, 50 parts water and 1 part glycerol said rhizobitoxine killing the rape within 14 days of application and said rhizobitoxine being degraded and rendered nontoxic by soil microorganisms within 3 days of application.

References Cited

UNITED STATES PATENTS 3,347,909   10/1967   Lowe et al. _____ 71—76

OTHER REFERENCES 22,720   10/1964   Japan _____ 71—79

OTHER REFERENCES

Johnson et al., "Responses of seedlings to extracts of soybean nodules" (1959) Nature 183, pp. 308–09 (1959).

Owens et al., "Rhizobial-induced chlorosis in soybeans etc.," (1965), Plant Physiol. 40, pp. 927–30 (1965).

Owens et al., "Production of the soybean-chlorosis toxin etc.," (1965), Plant Physiol. 40, pp. 931–33 (1965).

Chailakhyan et al., " Growth subs. in the secretion of Rhizobium spp." (1965), CA63, p. 16828 (1965).

Owens et al., "Rhizobium induced phytotoxin etc." (1968), CA69 No. 9089t (1968).

Klingman, "Weed Control As A Science" (1966), Wiley & Sons Inc., November 1966, New York, pp. 52 and 53 (1966).

LEWIS GOTTS, Primary Examiner

G. HOLLRAH, Assistant Examiner

U.S. Cl. X.R.

71—76, Dig. 1